Feb. 2, 1971    F. B. SYLVANDER    3,560,953
CONTROL MEANS FOR AN ELECTROMAGNETIC INDICATOR DEVICE
Filed Sept. 5, 1968

TIMING SIGNALS

INVENTOR.
FREDERICK B. SYLVANDER

BY Planto, Arens, Hartz, O'Brien

ATTORNEYS

United States Patent Office 3,560,953
Patented Feb. 2, 1971

3,560,953
CONTROL MEANS FOR AN ELECTROMAGNETIC INDICATOR DEVICE
Frederick B. Sylvander, Rutherford, N.J., assignor to The Bendix Corporation, a corporation of Delaware
Filed Sept. 5, 1968, Ser. No. 757,717
Int. Cl. G08b 5/14, 29/00; H01b 47/20
U.S. Cl. 340—319
10 Claims

ABSTRACT OF THE DISCLOSURE

Control means for an electromagnetic indicator device of a type including an electrically actuated magnetic indicator wheel for positioning discrete numbers or symbols on a rotating drum by electrical signals selectively applied to energize controlling electromagnet windings and including in the control of the energization thereof a means to prevent intermittent "hang-up" in selectively positioning indicia on the drum so that the drum may be angularly displaced one hundred and eighty degrees upon the application of a controlled energization of the electromagnetic windings effecting a disturbing torque for introducing a momentum into the magnetic wheel which will have negligible noticeable effect on the wheel when angularly turned to its command position, but which will cause the magnetic wheel when in a false null angular position to be efficaciously disturbed so as to cause the wheel to be displaced from the false null to the true null angular command position.

CROSS REFERENCE TO RELATED APPLICATIONS

The present invention relates to improvements in an electromagnetic indicator device of a type such as disclosed and claimed in U.S. Pat No. 3,392,382, granted July 9, 1968 to Leonard C. Pursiano and Arnold H. Cohen, and assigned to The Bendix Corporation, assignee of the present invention.

BACKGROUND OF THE INVENTION

Field of the invention

This invention relates to the field of magnetic indicating wheels and the required circuitry to drive such magnetic wheels to display a character corresponding to a four-bit digital code input to the system. Such magnetic wheels may, for example, display ten or more numerals, letters, or other characters. Each wheel will normally consist of a permanent magnet rotor carrying the characters to be displayed, and a stator structure having various coils which when excited singly, or possibly in combination, cause the rotor to assume a desired angular position.

Description of the prior art

Heretofore, as described and claimed in the U.S. Pat. No. 3,392,382, there has been provided an electromagnetic indicator embodying a five-pole electromagnetic assembly including selectively energized electromagnetic windings and a two-pole permanent magnet rotatably mounted in cooperative relation therewith, together with a novel pole piece affixed to the rotatable permanent magnet and so arranged in relation thereto and to the five-pole electromagnetic assembly as to eliminate discrepancies upon the selective energization of the electromagnetic windings for positioning in relation to a viewing window numbers or indicating symbols borne by a rotatable indicator drum driven by the permanent magnet.

In such prior type indicator device, each of ten wires is capable of exciting one or two adjacent coils, as appropriate, to display the required numeral. Diode logic is used to connect each of the ten wires to excite the proper coil or coils. The U.S. Pat. No. 3,392,382 concerns means for overcoming a major problem associated with magnetic number wheels. The torque available to start moving the rotor from its actual position $\theta_a$ to its commanded position $\theta_c$ is $T_m \sin(\theta_c - \theta_a)$. Hence when the actual and commanded positions are 180° apart, there is no torque available. The wheel will thus remain at its original position unless sufficient vibration or other means are used to move it sufficiently off its original position.

The wheel described in the aforenoted U.S. Pat. No. 3,392,382 has also the feature that its magnetic structure design is such as to detent it in its present position whenever the excitation is removed. This detenting torque gradient is normally designed to be sufficient to keep the wheel from oscillating objectionably in the case of the expected vibrational forces. When it is desired to move the rotor from a present position to an immediately adjacent position it is seen that the torque available from the excitation equals $T_m \sin 36°$ and must be equal to or greater than the torque exerted by the magnetic detent.

Thus it can be seen that the maximum torque $T_m$ available from the excitation in some cases is equal to or greater than $1/\sin 36°$ times the torque due to the detent. Since the power required for a given winding to produce torque varies as the square of the desired torque, it is seen that at least four times as much power is consumed in the above case as would be required to produce a necessary anti-vibrational torque gradient (considered as being equal to the detent torque gradient). Also it can be seen that the required torques are determined solely by the amount needed to overcome the detent torque; whereas in such an electromagnetic indicator device having no detent feature, the necessary torque would be determined by the much lower level of the friction in the device.

The detent feature described and claimed in U.S. Pat. No. 3,392,382 is well suited to certain applications, principally those in which a numeral is to be held without change for fairly long periods of time, during which no power need be applied. It also makes use of the detent feature to overcome the ambiguous 180° position problem. This is done by means of a magnetic shunt device which causes the energized and de-energized numeral positions to differ by several degrees of angle, always in the same direction. Thus the actual and commanded positions can never be exactly 180° apart.

The system described in U.S. Pat. No. 3,392,382 has however a severe disadvantage in its high power requirement, since the usual application of a numeral wheel is inside of a sealed indicator, and usually at least three wheels are used to display a single parameter, and, for example, eight wheels would be required to display longitude alone. The total power required in a typical configuration would cause a serious temperature rise inside of the indicator. Several means of decreasing this power may be utilized: (1) Apply power only when the input data changes (this would require fairly complex logic circuitry to implement, including a digital memory means in order to detect a change of input data). (2) Detect when a change of 180° is being called for on a wheel, and call for briefly an intermediate position (this also requires an excessive amount of additional logic circuitry associated with each wheel). (3) Apply power only part-time to each wheel (this has little advantage since response of a wheel is normally required in less than ½ second and its normal response time is about ¼ second. Therefore, only a 50% reduction in power would be obtained, at the expense of complex and relatively unreliable power-switching circuitry).

The heretofore noted problem areas of the prior suggested devices have been overcome in the present invention by the provision of a modified digital code input to prevent an ambiguous output which could possibly occur one hundred and eighty degrees (180°) out of phase with a correct shaft position and which in the present invention is effected by the application of a disturbing torque into a magnetic indicator wheel, which will have negligible noticeable effect on the wheel when turned to its commanded position, but which will cause the magnetic indicator wheel when turned to a false null position to be angularly actuated off the false null position so that the magnetic indicator wheel may thereupon turn under the magnetic force thereof to its true commanded angular position.

As to the foregoing features of the present invention, it may be noted that U.S. Pat. No. 3,071,324, granted Jan. 1, 1963, to George F. Schroeder et al. relates to a synchro to digital converter having coarse and fine synchro units. To prevent ambiguity between the coarse and fine register readouts, the coarse register contains two extra digits corresponding to the most significant digits of the fine synchro. A comparison is made between these two extra digits and the comparable fine synchro digits, and if an error is present, a "1" is added or subtracted to the register, thus modifying the stored code. This device merely illustrates the broad concept of modifying a code to correct a synchro error.

Further, U.S. Pat. No. 2,928,033, granted Mar. 8, 1960, to Wilton R. Abbott discloses a digital comparator in which, when one number is to be subtracted from another number, the numbers of each register are augmented prior to the subtraction. This, again, illustrates broadly the modification of a code to perform some operation.

Moreover, U.S. Pat. No. 2,727,194, granted Dec. 13, 1955, to Eugene Seid discloses a digital servo device for rotating a motor, the output being a shaft position. The device has an error sensing and correcting mechanism utilizing counters into which are fed pulses indicative of the error remaining. The motor is then driven to reduce the count to zero.

The ambiguity resolver of the present invention relates to distinctly different problems and idea of means for the solution of such problems and as to which the prior type indicators have evidenced no recognition of such problems much less any idea of means for the solution thereof.

SUMMARY OF THE INVENTION

Control means for an electromagnetic indicator utilizing an electrically actuated magnetic indicator wheel in which a disturbing torque is provided to introduce a momentum to the rotor of the magnetic wheel, which will have negligible effect on a wheel turned to its commanded position but which will cause a wheel turned to a false null position to turn to its true commanded position.

DESCRIPTION OF THE PREFERRED EMBODIMENT

Figure 1:
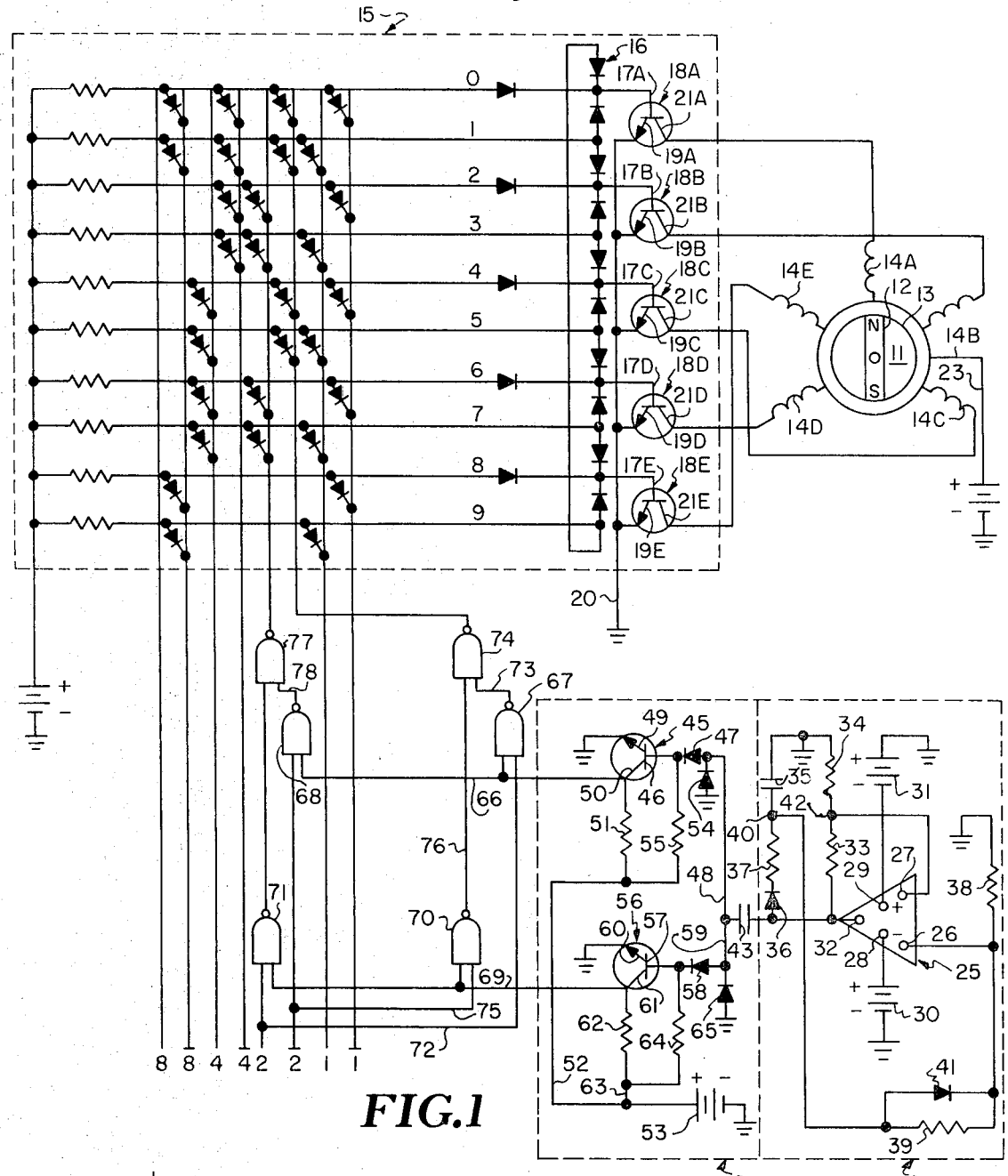
FIG. 1 is a schematic diagram of an indicator device embodying the invention.

Referring now to FIG. 1 of the drawing, a magnetic numeral wheel is designated generally by the numeral 11 and may be similar to that illustrated and described in U.S. Pat. No. 3,392,382, granted July 9, 1968 to Pursiano et al., and assigned to The Bedix Corporation, assignee of the present invention, with the exception that the magnetic detent is omitted. The wheel 11 has a permanent magnet rotor 12 which carries a rotatable indicator drum 13 which for the purpose of illustration may have ten numerals or characters. It is understood that the wheel 11 would be mounted in a suitable housing having a window for viewing the numerals as illustrated in the said U.S. Pat. No. 3,392,382. The wheel 11 also includes a plurality of stator windings 14, for purposes of illustration five, 14A, 14B, 14C, 14D and 14E. The windings 14A, 14B, 14C, 14D and 14E when energized singly or in combination will cause the rotor 12 to assume a desired portion.

The windings 14 of the wheel 11 are energized by a logic circuit 15 which recognizes digital input signals. The logic circuit 15 may be of the diode or gate type logic circuitry. The digital input signals may be in a standard binary coded decimal form (BCD) such as 8421 code, 5421 code, 5521 code, or any other unique code. The 8421 code is being used for purposes of illustration. The BCD input is converted by the logic circuit 15 into 10 lines 0 to 9. The lines 0 to 9 are connected by diode logic 16 to bases 17A, 17B, 17C, 17D and 17E of transistors 18A, 18B, 18C, 18D and 18E, respectively. The transistors 18A, 18B, 18C, 18D and 18E have respective emitters 19A, 19B, 19C, 19D and 19E connected by conductor 20 to ground and collectors 21A, 21B, 21C, 21D and 21E connected by conductors 22A, 22B, 22C, 22D and 22E to one side of the respective windings 14A, 14B, 14C, 14D and 14E. The other side of the windings 14A, 14B, 14C, 14D and 14E are connected by conductor 23 to ground.

A timing generator 24 includes an amplifier 25 having an inverting input 26, a non-inverting input 27, and power inputs 28 and 29, with the input 28 connected to a source of positive potential direct current illustrated as a battery 36 and the power input 29 connected to a source of negative direct current shown as a battery 31. The amplifier 25 has an output 32 which is connected to ground through a resistor 33 and resistor 34. Also the output 32 is connected to one side of a capacitor 35 through a diode 36 and resistor 37. The other side of the capacitor 35 is connected to ground.

The inverting input 26 of the amplifier 25 is connected to ground through a resistor 38 and is also connected by resistor 39 to a point 40 intermediate resistor 37 and capacitor 35. A diode 41 is connected across the resistor 39. The non-inverting input 27 of the amplifier 25 is connected to a point 42 intermediate the resistor 33 and the resistor 34.

Figure 2:
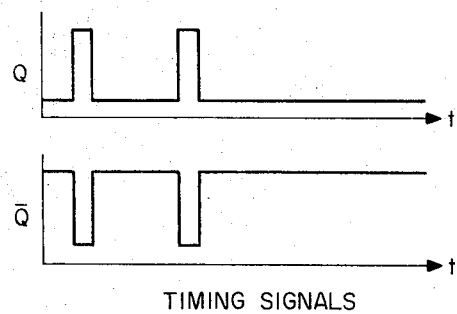
FIG. 2 is a graphical illustration of timing signals utilized in the invention.

The output from the timing generator 24 is connected by a capacitor 43 to the input of a wave shaper 44. A transistor 45 has a base 46 connected by a diode 47 and conductor 48 to the capacitor 43. The transistor 45 also has an emitter 49 connected to ground and a collector 50 connected by resistor 51 and conductor 52 to the positive side of a direct current source shown as a battery 53 which has the negative side connected to ground. A resistor 55 is connected from the base 46 of the transistor 45 to the conductor 52. Another transistor 56 has a base 57 connected by diode 58 and conductor 59 to the capacitor 43. Also the transistor 56 has an emitter 60 connected to ground and a collector 61 connected by resistor 62 and conductor 63 to the positive side of the battery 53. A resistor 64 is connected between the base 57 of the transistor 56 and the conductor 63 and a diode 65 is connected from the conductor 59 to ground. The outputs from the wave shaper 44 are pulses, for example as illustrated in FIG. 2.

The collector 50 of the transistor 45 is connected by conductor 66 to one input of logic 67 and to one input of logic 68 and the collector 61 of the transistor 56 is connected by conductor 69 to one input of logic 70 and to one input of logic 71. Another input of the logic 67 is connected by conductor 72 to the $\overline{2}$ bit input. The output of the logic 67 is connected by conductor 73 to one input of a logic 74. Another input of the logic 70 is connected by conductor 75 to the $\overline{2}$ bit input and the output of the logic 70 is connected by conductor 76 to an input of the logic 74. The output of the logic 74 is connected to the $\overline{2}$ bit input to the matrix 15.

The logic 71 has another input connected to the 2 bit input and an output connected to one input of a logic 77. The other input of the logic 77 is connected by conductor 78 to the output of the logic 68 and the output of the logic 77 is connected to the 2 bit input to the matrix 15. The logic 68 also has an input connected to the $\overline{2}$ bit input.

In the operation of the system, the timing generator 24 together with the wave shaper 44 puts out two complementary pulses Q and $\overline{Q}$ which control the input data so that "C" bit (weighted as 2) is replaced by its complement for a short period of time out of each cycle period, for example 0.02 second out of every 1.0 second. During this short period of time the input data will be either 2 more or less than the input received. Thus in the case where the wheel is positioned 180° from its command position, a momentary torque equals $TM \sin 72°$ is applied to the wheel. This produces a velocity and momentum in the rotor to turn it away from its false nul position, and in addition turns in away from that position by a small angle preferably less than one degree. Then the normal torques are restored for the major part of the cycle which wil turn the wheel to its commanded position 180° away from its false null position. In a case where the wheel is actually at its commanded position, the application of the disturbing signal will have negligible apparent effect on the wheel position, since the disturbing momentum is immediately counteracted by a torque to return the wheel to its correct position.

While a 2 bit has been illustrated to produce the disturbing torque, it is understood that others could be used, for example 4 bit. The principle of this invention is that for codes and wheels utilized, the bit complemented shall cause a suitable amount of disturbing torque.

Although only one embodiment of the invention has been illustrated and described, various changes in the form and relative arrangement of the parts, which will now appear to those skilled in the art, may be made without departing from the scope of the invention.

What is claimed is:

1. In an electromagnetic indicator device of a type having a permanent magnet rotor carrying characters to be displayed, a stator having a plurality of electromagnetic coils spaced equidistantly around said stator and in operative relationship with said permanent magnet rotor; control means comprising a logic circuit, digital input signals for said logic circuit, switching means connecting the output of said logic circuit to said electromagnetic coils, said logic circuit being responsive to said digital input signals to actuate said switching means to energize at least one of said electromagnetic coils to move said permanent magnet rotor in accordance with said digital input signals, and means for introducing a disturbing torque for a predetermined time less than the duration of said digital input signals upon said permanent magnet rotor to displace said permanent magnet rotor a predetermined amount to cause said permanent magnet rotor turned to a false null position to turn to its true command position in response to said digital input signals.

2. The combination as set forth in claim 1 in which said means for introducing a disturbing torque includes a timing generator connected by logic to alter said digital input signals by a predetermined bit.

3. The combination as set forth in claim 2 in which said change is a 2 bit.

4. The combination as set forth in claim 2 in which one bit of said digital input signals is periodically complemented by said timing generator.

5. The combination as set forth in claim 2 and including a wave shaper responsive to said timing generator to provide complementary pulses to provide a signal to last said logic to alter said digital input signals.

6. The combination as set forth in claim 1 in which said switching means are a plurality of transistors.

7. The combination as set forth in claim 1 in which said logic circuit is a diode matrix.

8. The combination as set forth in claim 7 in which said diode matrix converts said digital input signals to ten lines.

9. The combination as set forth in claim 8 in which each of said lines controls at least one of said switching means.

10. The combination as set forth in claim 1 in which said digital input signals is an 8421 code.

References Cited

UNITED STATES PATENTS

| | | | |
|---|---|---|---|
| 3,102,259 | 8/1963 | Totz | 340—347 |
| 3,218,625 | 11/1965 | Knotowicz | 340—324 |
| 3,376,569 | 4/1968 | Watkins | 340—3 |

DONALD J. YUSKO, Primary Examiner

W. BENSON, Assistant Examiner

U.S. Cl. X.R.

318—138; 340—166, 324